US012661977B2

(12) United States Patent
Nieuwland et al.

(10) Patent No.: US 12,661,977 B2
(45) Date of Patent: Jun. 23, 2026

(54) MODULAR FUEL CELL AND H2 STORAGE SYSTEM FOR VEHICLES

(71) Applicant: Hyster-Yale Group, Inc., Fairview, OR (US)

(72) Inventors: Willem Jacobus Nieuwland, Helmond (NL); Neha Roy, Arnhem (NL); Bram Kuipers, Velp (NL); Joost Hoogduin, Nijmegen (NL); Narendra Gupta, Eindhoven (NL); Menno de Lint, Oud Gastel (NL)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 614 days.

(21) Appl. No.: 17/980,797

(22) Filed: Nov. 4, 2022

(65) Prior Publication Data

US 2024/0149666 A1 May 9, 2024

(51) Int. Cl.
| | |
|---|---|
| *B60K 15/07* | (2006.01) |
| *B60K 15/03* | (2006.01) |
| *B60L 50/60* | (2019.01) |
| *B60L 50/71* | (2019.01) |
| *B60L 58/26* | (2019.01) |
| *B62D 65/10* | (2006.01) |

(52) U.S. Cl.
CPC .............. *B60K 15/07* (2013.01); *B60L 50/66* (2019.02); *B60L 50/71* (2019.02); *B60L 58/26* (2019.02); *B62D 65/10* (2013.01); *B60K 2015/03315* (2013.01)

(58) Field of Classification Search
CPC .... B60K 2001/0455; B60K 2001/0405; B60K 2001/0461; B60L 50/71
See application file for complete search history.

(56) References Cited

U.S. PATENT DOCUMENTS

| | | | | |
|---|---|---|---|---|
| 3,708,028 A | * | 1/1973 | Hafer .................. | H01M 50/249 |
| | | | | 104/34 |
| 7,533,748 B2 | | 5/2009 | Miyajima et al. | |
| 7,641,017 B2 | | 1/2010 | Nozaki et al. | |
| 2002/0006325 A1 | * | 1/2002 | Granroth .............. | B66F 9/0655 |
| | | | | 414/685 |

(Continued)

FOREIGN PATENT DOCUMENTS

| | | | | | |
|---|---|---|---|---|---|
| CN | 111055721 A | * | 4/2020 | .............. | B60L 53/80 |
| CN | 113415143 A | * | 9/2021 | .............. | B60K 1/04 |

(Continued)

OTHER PUBLICATIONS

European Search Report, EPO Pat. Appl. No. 23207116.7 (Mar. 28, 2024).

*Primary Examiner* — John Olszewski

(57) ABSTRACT
A modular assembly for a fuel-cell vehicle is configured to connect to a bracket arranged along a longitudinal frame of the vehicle. The modular frame can include one or more components for powering the vehicle, including one or more of a fuel cell, a battery, a battery cooling system, and hydrogen storage tanks. The modular assembly can communicate with the fuel-cell vehicle through standard integration components regardless of the particular components in the modular assembly. The modular assembly can be readily removed from the fuel-cell vehicle and replaced with a different modular assembly containing different components.

20 Claims, 9 Drawing Sheets

(56)     References Cited

U.S. PATENT DOCUMENTS

| | | | |
|---|---|---|---|
| 2005/0029022 A1 | 2/2005 | Kubusch et al. | |
| 2011/0174561 A1* | 7/2011 | Bowman | B60L 15/2009 |
| | | | 180/65.245 |
| 2015/0372322 A1* | 12/2015 | Shimoyana | B60K 15/063 |
| | | | 429/515 |
| 2017/0101003 A1* | 4/2017 | Zimmerman | B60K 15/067 |
| 2019/0291673 A1* | 9/2019 | Ajam | B60Q 1/302 |
| 2020/0231212 A1* | 7/2020 | Kim | B62D 21/08 |
| 2021/0276848 A1* | 9/2021 | Miller | B25J 9/1689 |
| 2021/0387519 A1* | 12/2021 | Landvik | H01M 50/244 |
| 2021/0387534 A1* | 12/2021 | Sjöholm | B60L 50/66 |
| 2022/0289066 A1* | 9/2022 | Kim | B60L 53/80 |

FOREIGN PATENT DOCUMENTS

| | | | | |
|---|---|---|---|---|
| CN | 113635973 A | | 11/2021 | |
| CN | 113829872 A | | 12/2021 | |
| CN | 114056072 A | * | 2/2022 | B60K 1/04 |
| CN | 114435103 A | * | 5/2022 | B60G 15/02 |
| CN | 113415178 B | | 7/2022 | |
| CN | 115107493 A | * | 9/2022 | |
| DE | 102008012406 A1 | | 9/2009 | |
| EP | 2075215 A2 | | 7/2009 | |
| WO | 2022149053 A1 | | 7/2022 | |
| WO | WO-2022199985 A1 | * | 9/2022 | B60K 1/04 |

* cited by examiner

MODULAR FUEL CELL AND H2 STORAGE SYSTEM FOR VEHICLES

TECHNICAL FIELD

This disclosure relates generally to methods and mechanisms for providing fuel cells and hydrogen ("H₂") storage systems to materials-handling vehicles, such as lift trucks or reach trucks (stackers).

BACKGROUND INFORMATION

Conventional fuel-cell vehicles may use hydrogen-powered fuel cells to power an electric motor and other electric vehicle components. Such vehicles may include a battery pack, fuel cells, and hydrogen cylinders attached by brackets to a longitudinally-arranged main frame of the vehicle. The hydrogen cylinders contain fuel for the fuel cells which oxidize the hydrogen to create electricity. The hydrogen fuel cells may be provided with radiators arranged along both sides of the main frame. While conventional systems are designed to make efficient use of space, they lack easy upgradeability for different power requirements.

OVERVIEW OF DISCLOSURE

According to principles of the present inventive concepts, a fuel-cell vehicle includes a fuel cell and H₂ storage system having a modular buildup. The vehicle's conventional frame can accommodate a hydrogen fuel cell, hydrogen cylinders, an electric drive train, EMC (electromagnetic compatibility) filter boxes, DC/DC inverters, cooling systems, and rechargeable batteries (e.g., lithium-ion ("Li-ion") batteries) provided in a modular manner. The electric drive train of the vehicle is preferably arranged in a space between the longitudinal side frames of the main frame. Brackets are attached to each of the side frames to receive modular frames. The modular frames may be secured to the frame before adding the battery, fuel cell, and/or hydrogen cylinder components in the modular frames.

Of course, the components, like Li-ion batteries, truck or battery cooling systems, inverters, EMC filter boxes, etc., can alternatively be arranged in a modular frame before the modular frame is attached to the main frame. Similarly, hydrogen storage cylinders and/or hydrogen fuel cells may be assembled into a modular frame before, or after, the modular frame is secured to the main frame. Using a modular frame, any number of hydrogen storage tanks (e.g., 4 to 6) or fuel cells (e.g., 1 or 2) can, for example, be arranged along the frame according to customer demand, thereby optimizing truck cost.

Modular frames support configurability for different application demands. For example, different combinations of fuel cells, hydrogen storage containers, cooling systems, batteries, etc., can be assembled into a vehicle at a customer facility depending on the customer's needs rather than being provided in a single preassembled configuration from the factory. Using modular frames also makes it simple to upgrade/downgrade to higher/different configurations within a manufacturing facility or by dealers. For instance, an entire modular frame could be easily removed from a truck and replaced with a new modular frame containing upgraded or different components, or components could be removed or replaced within a modular frame arranged on a vehicle.

Moreover, use of the same integration parts like tubing, cables, and radiators is facilitated and helps reduce costs by permitting higher parts volumes and lesser part numbers to maintain. The mechanical and electrical connections between the truck and the components contained in a modular frame can be made identical, or nearly identical, which can lead to use of fewer parts across different truck configurations.

According to one embodiment, a frame for a conventional internal combustion engine reach stacker could be used to make a fuel-cell vehicle. The fuel-cell vehicle comprises a main frame having a space between two longitudinal frame members that receives an electric drive train assembly. Brackets are attached to the longitudinal frame members of the main frame body. The brackets support attachment of modular frame members. Each modular frame member accommodates one or more separate components, such as one or more Li-ion batteries, DC/DC inverter, EMC filter box, and a truck or battery cooling system. The modular frame members can also accommodate one or more hydrogen storage cylinders and/or one or more hydrogen fuel cells. The entire modular frame can be removed from the brackets and replaced with a new modular frame having different components depending on customer desires. The same integrated parts (like tubing, cables, and radiators) can be used in the fuel-cell vehicle regardless of the number of components in the modular frames. The use of the same integrated parts helps to use fewer parts across different vehicle configurations.

According to principles of the present inventive concepts, the customer can therefore select a desired combination of fuel cells, hydrogen storage tanks, and batteries based on its specific needs. The truck can either be supplied with the desired components by the factory or dealer using a modular assembly, or the customer can easily provide the vehicle with the desired components on-site. Additionally, the configuration of fuel cell, battery, and hydrogen storage tank components can be readily modified by the customer as its needs change.

Additional aspects and advantages will be apparent from the following detailed description of example embodiments, which proceeds with reference to the accompanying drawings.

BRIEF DESCRIPTION OF THE DRAWINGS

The foregoing and additional objects, features, and advantages of the present inventive concepts will become more readily apparent from the following detailed description of preferred embodiments, depicted in the attached drawings, in which.

DETAILED DESCRIPTION OF EMBODIMENTS

Figure 1:
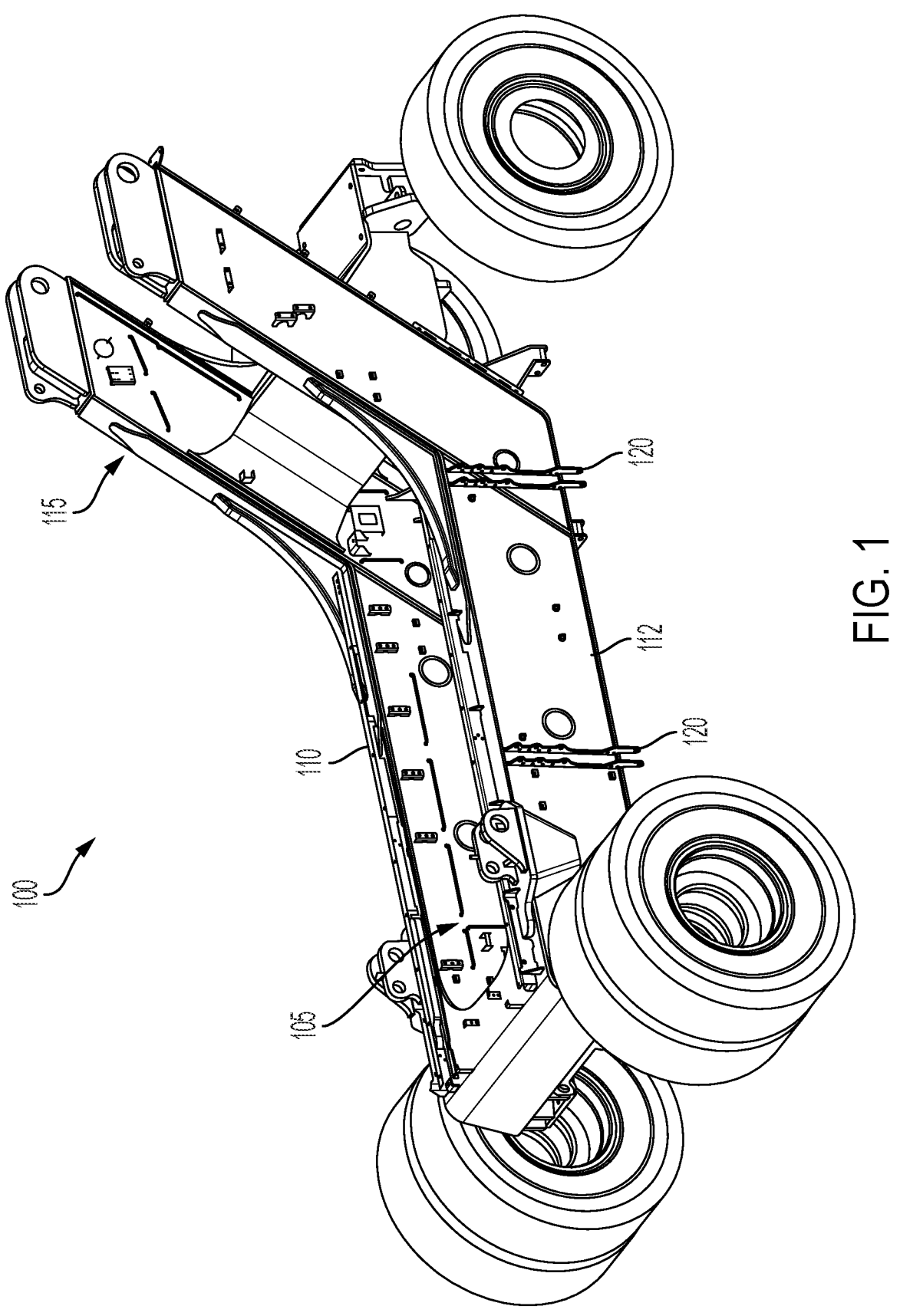
FIG. 1 is an isometric illustration of a frame for a conventional internal combustion engine reach truck including brackets arranged along longitudinal frame members according to an embodiment of the present inventive concepts.
Figure 2:
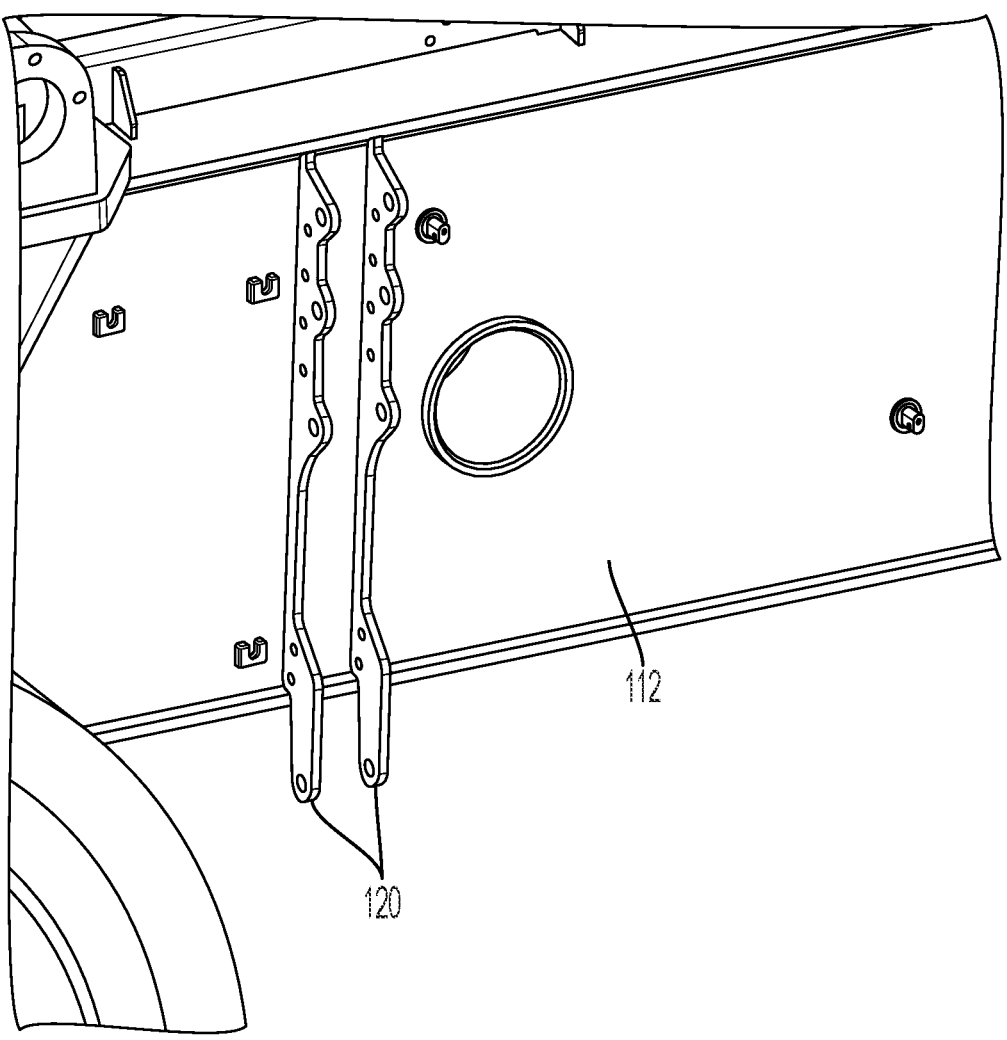
FIG. 2 is a close-up view of the brackets arranged along the frame of FIG. 1.
Figure 3:
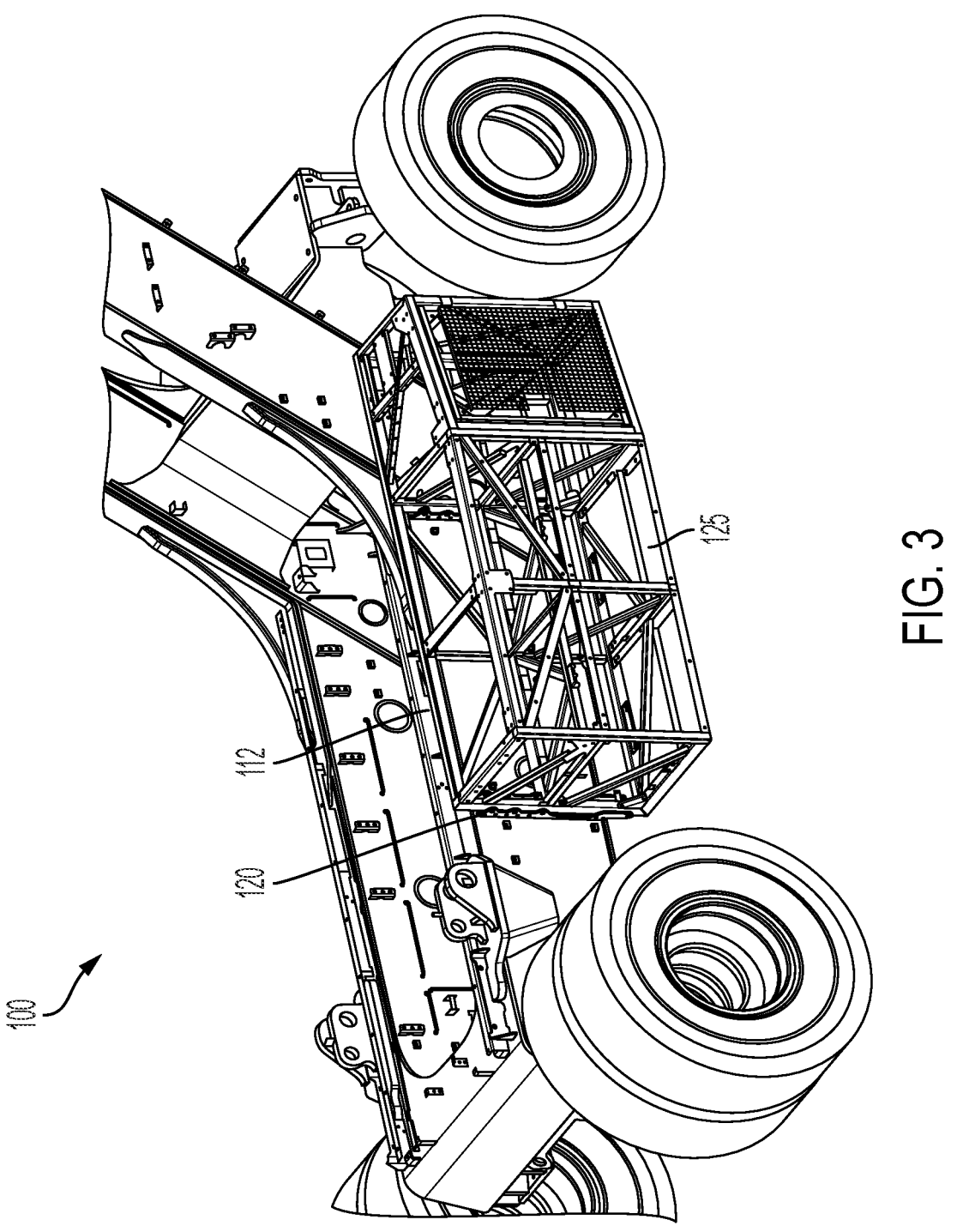
FIG. 3 is an isometric illustration of the frame of FIG. 1 having modular frames attached to the brackets, according to additional principles of the present inventive concepts.
Figure 4:
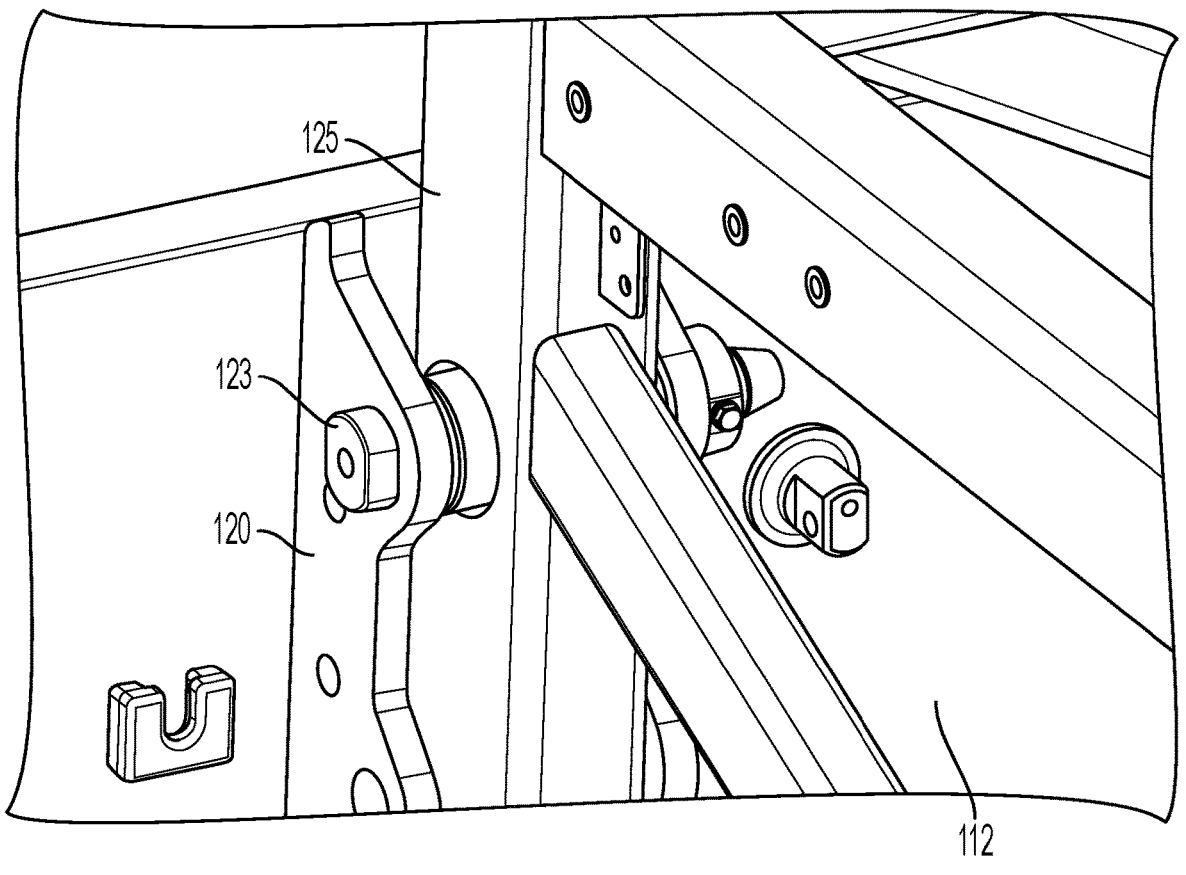
FIG. 4 is a close-up view showing a connection between the bracket and the modular frame.
Figure 5:
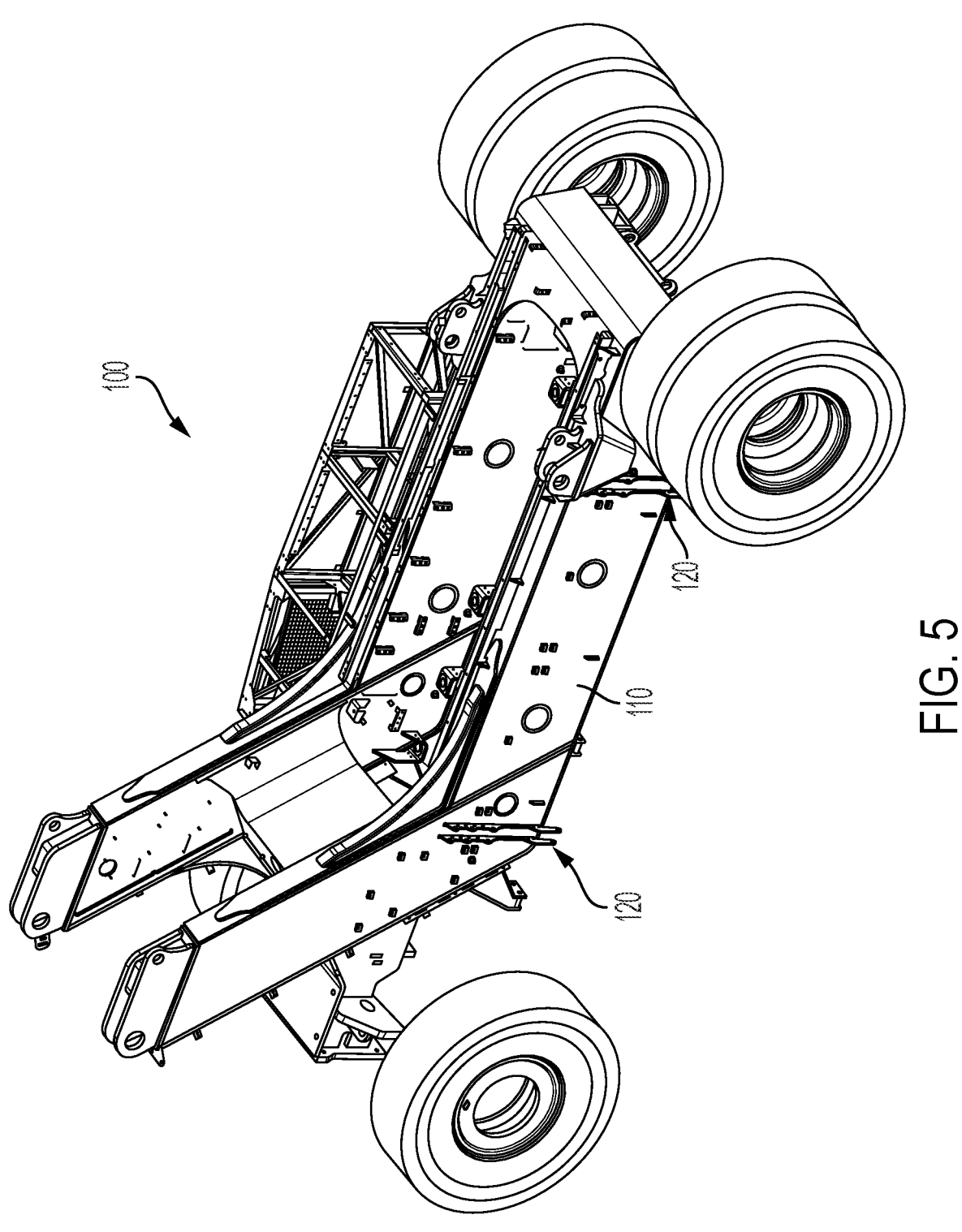
FIG. 5 is an isometric illustration of the vehicle frame of FIG. 3, further illustrating brackets arranged on an opposite side of the vehicle frame.
Figure 6:
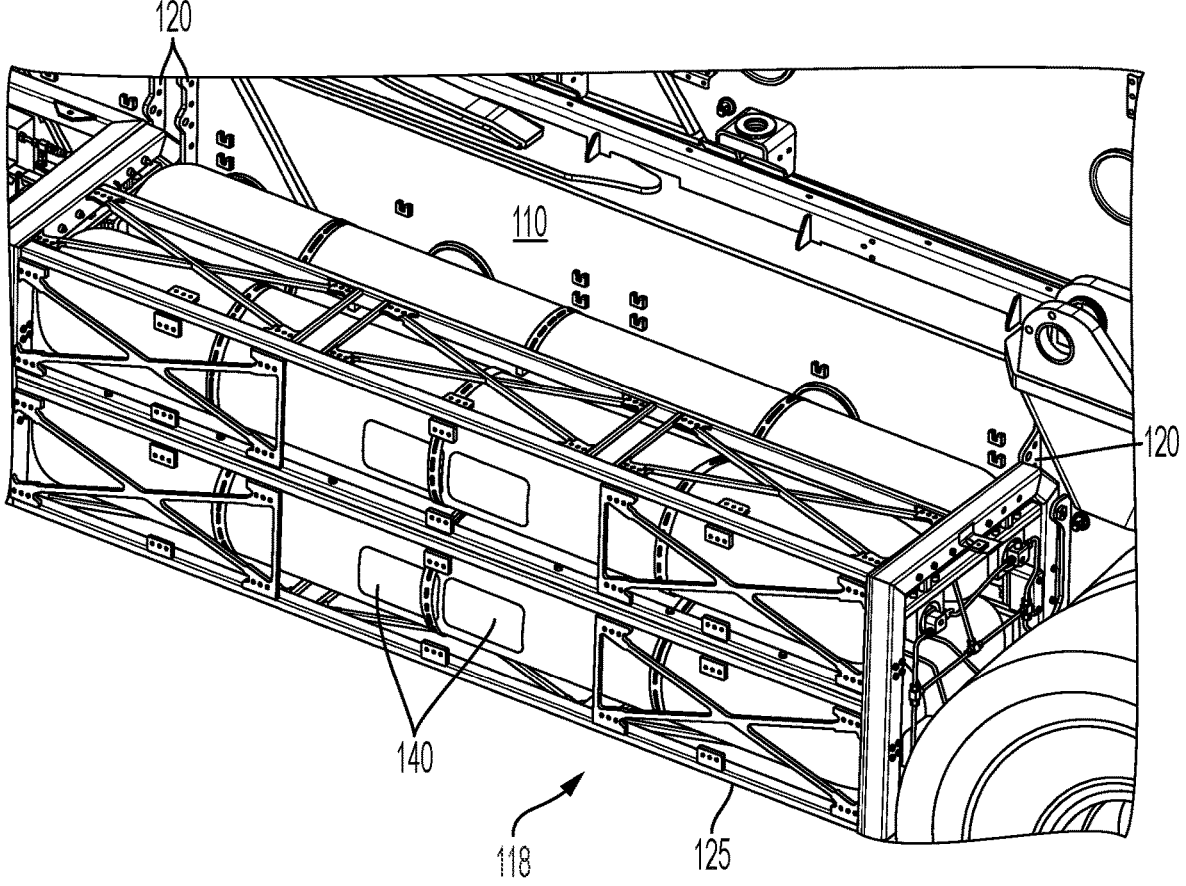
FIG. 6 is an isometric illustration of modular frames including hydrogen storage tanks connected to the brackets arranged on the opposite side of the vehicle frame of FIG. 5.
Figure 7:
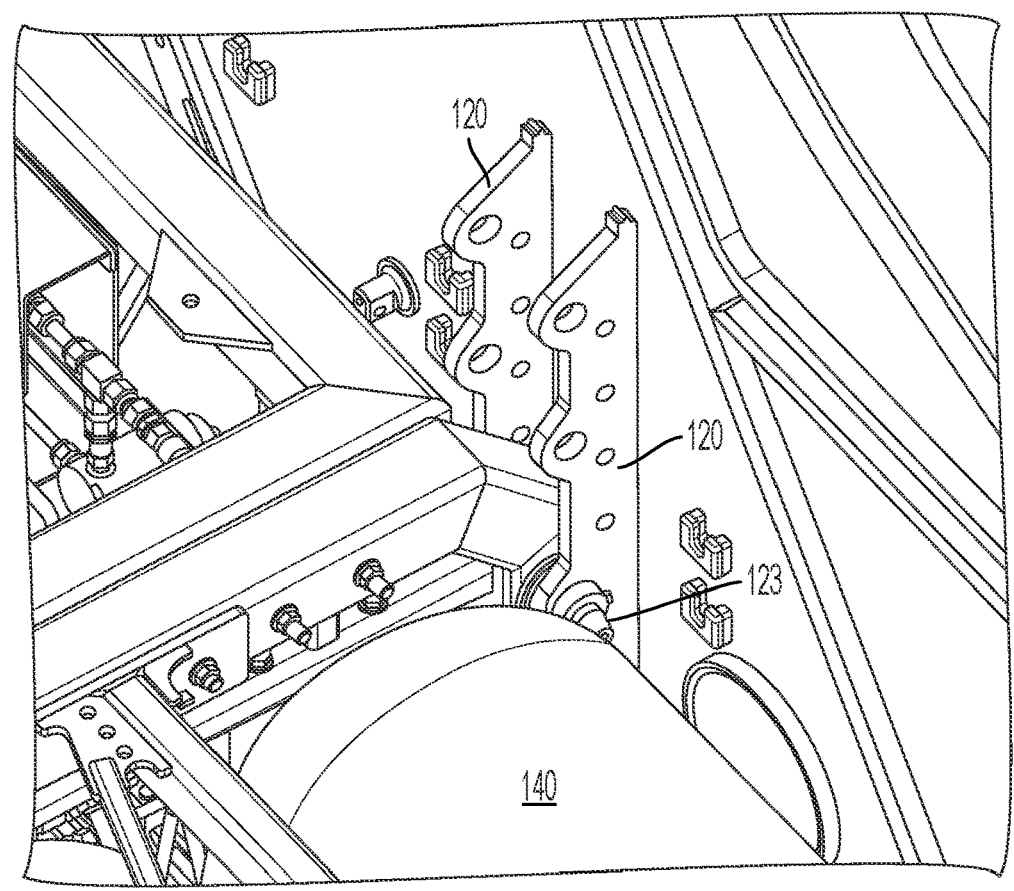
FIGS. 7 and 8 are close-up views illustrating an attachment between the modular frames and the brackets of FIG. 6.
Figure 8:
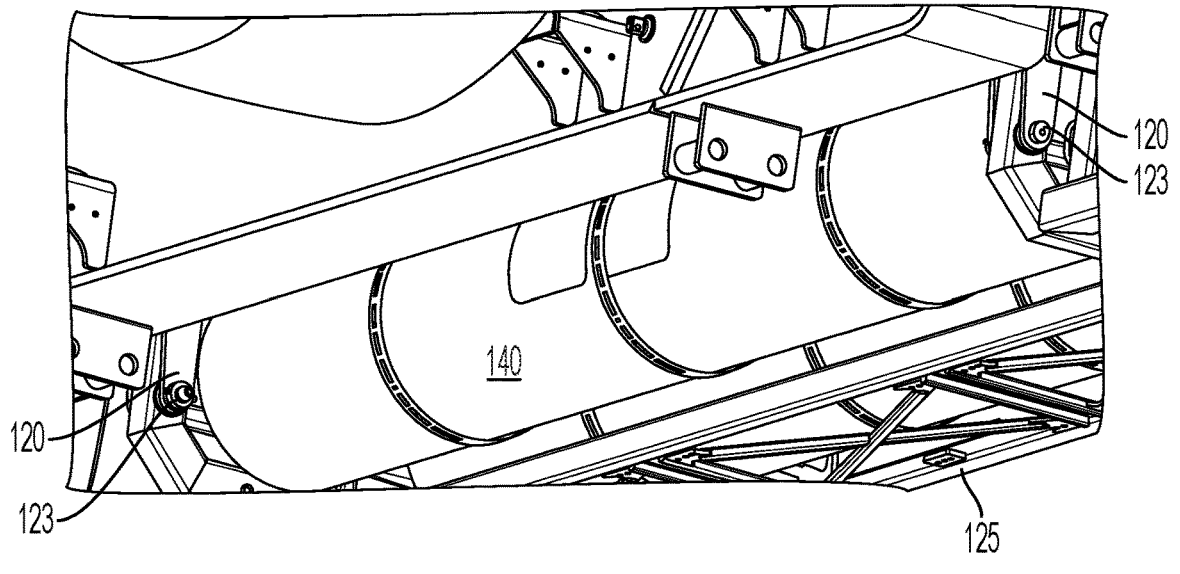

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete and will convey the scope of the disclosure to those skilled in the art.

FIGS. 1-12 illustrate a fuel-cell vehicle 100 in various stages of construction having modular components arranged in modular assemblies 118 along a conventional frame 115 for an internal combustion engine reach truck 100. Referring to FIGS. 1-12, according to principles of the present inventive concepts, a fuel-cell vehicle 100 includes a fuel cell and $H_2$ storage system having a modular buildup. The vehicle's conventional reach truck frame 115 can accommodate one or more hydrogen fuel cells 130, one or more hydrogen cylinders 140, an electric drive train (not shown), Li-Ion batteries (not shown), a DC/DC inverter 131 to boost fuel cell voltage to battery voltage, and other components provided in a modular manner. The electric drive train (not shown) of the vehicle 100 is preferably arranged in the space 105 between longitudinal side frames 110 and 112 of the main frame 115. Brackets 120 are attached to each of the side frames 110, 112 (preferably on the exterior sides of the side frames 110, 112) to receive the modular frames 125. The modular frames 125, 125A may be secured to the frame 115 before adding the battery (not shown), inverter 131, fuel cell 130, and/or hydrogen cylinder 140 components in the modular frames 125.

Of course, the components, like Li-ion batteries, inverter 131, a truck cooling manifold system 133, and other components, can be arranged in a modular frame 125 before the modular frame 125 is attached to the main frame 115. Similarly, hydrogen storage cylinders 140 and/or a hydrogen fuel cell 130 may be assembled into a modular frame 125 before, or after, the modular frame 125 is secured to the main frame 115. Using modular frames 125, any desired number (e.g., 4 to 6) of hydrogen storage tanks 140 or (e.g., 1 or 2) fuel cells 130 can, for example, be arranged along the frame 115 according to customer requirements, thereby optimizing truck cost for the given customer needs.

The use of modular frames 125 supports configurability for different application demands. For example, different combinations of fuel cells 130, hydrogen storage containers 140, cooling systems, batteries, etc., can be assembled into a vehicle 100 at a customer facility depending on the customer's needs, rather than being provided in a single preassembled configuration from the factory. Using modular frames 125 also makes it simple to upgrade/downgrade to higher/different configurations within a manufacturing facility or by dealers. For instance, an entire modular frame 125 could be easily removed from a truck and replaced with a new modular frame 125 containing upgraded or different components, or components could be removed or replaced within a modular frame 125 arranged on a vehicle 100. Additional modular frames 125A could also be added on to supplement or upgrade performance capabilities of the vehicle 100.

Moreover, with the modular system, use of the same integration parts 150 like tubing, cables, and radiators is facilitated and helps reduce costs by permitting higher parts volumes and lesser part numbers to maintain. The mechanical and electrical connections between the truck 100 and the components contained in a modular frame 125 can be made identical, or nearly identical, regardless of the components housed in a modular frame 125 which can lead to use of fewer parts across different truck configurations.

According to one embodiment, as shown in FIGS. 1-12, a fuel-cell vehicle 100 comprises a main frame 115 having a space 105 between two longitudinal frame members 110, 112 that can receive an electric drive train assembly (not shown). Brackets 120 are attached to the longitudinal frame members 110, 112 of the main frame body 115.

The brackets 120 support attachment of modular frame members 125 of modular assemblies 118. Each modular frame member 125 accommodates one or more separate components, such as Li-ion batteries (not shown), a DC/DC inverter 131, an EMC filter box 132, a truck cooling manifold system 133, and other components. Support members 135 (illustrated in FIG. 12) can be provided to attach the internal components to the modular frame 125. A truck cooling manifold 133 can provide cooling for the truck 100. Additional DC/DC inverter components 134 can also be included within the modular frame member 125. The modular frame members 125 can also accommodate a hydrogen storage cylinder 140 and/or a hydrogen fuel cell 130. The entire modular frame 125 can be removed from the brackets 120 and replaced with a new modular frame 125 having different components depending on customer desires. The same integrated parts 150 (like tubing, cables and radiators) can be used in the vehicle 100 regardless of the components in the modular frames 125 and thereby helps to use fewer parts across different vehicle configurations.

Figure 9:
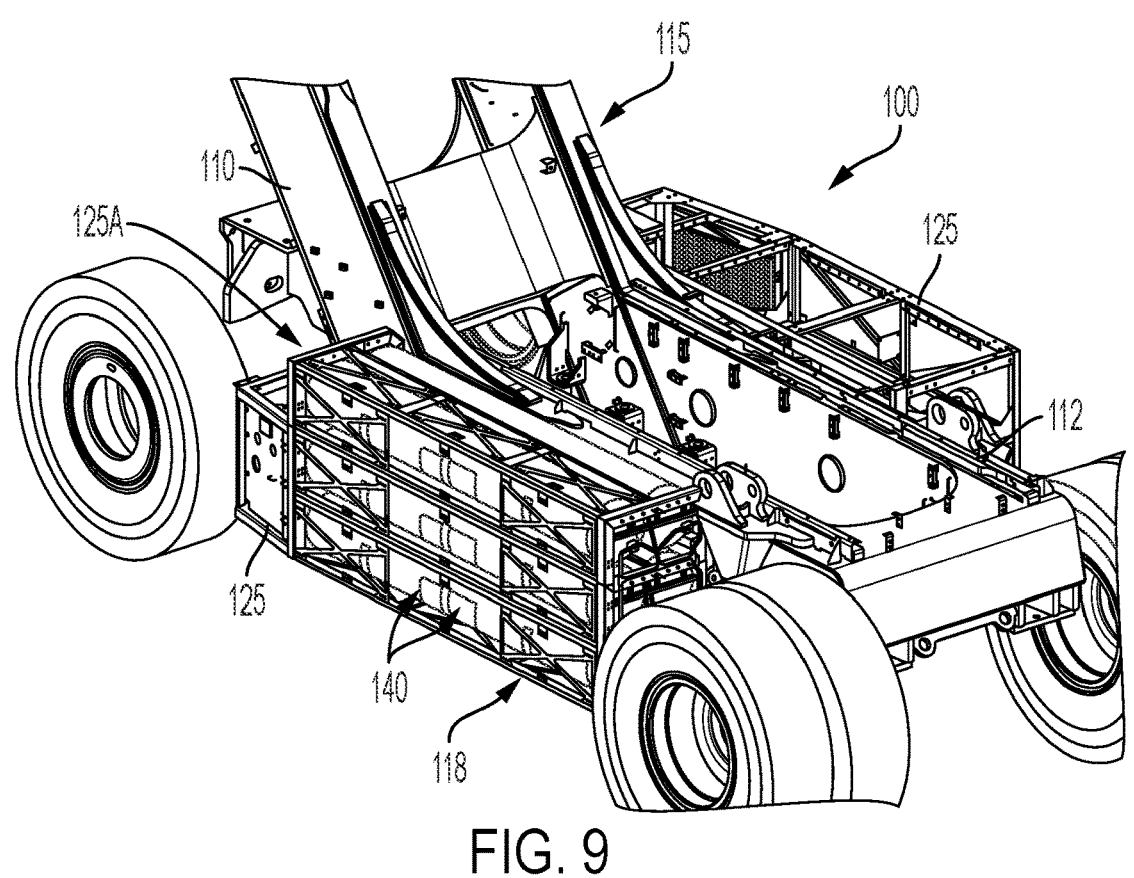
FIG. 9 is an isometric illustration of an additional modular frame added to the modular frames of FIG. 6 to provide additional hydrogen storage tanks.
Figure 10:
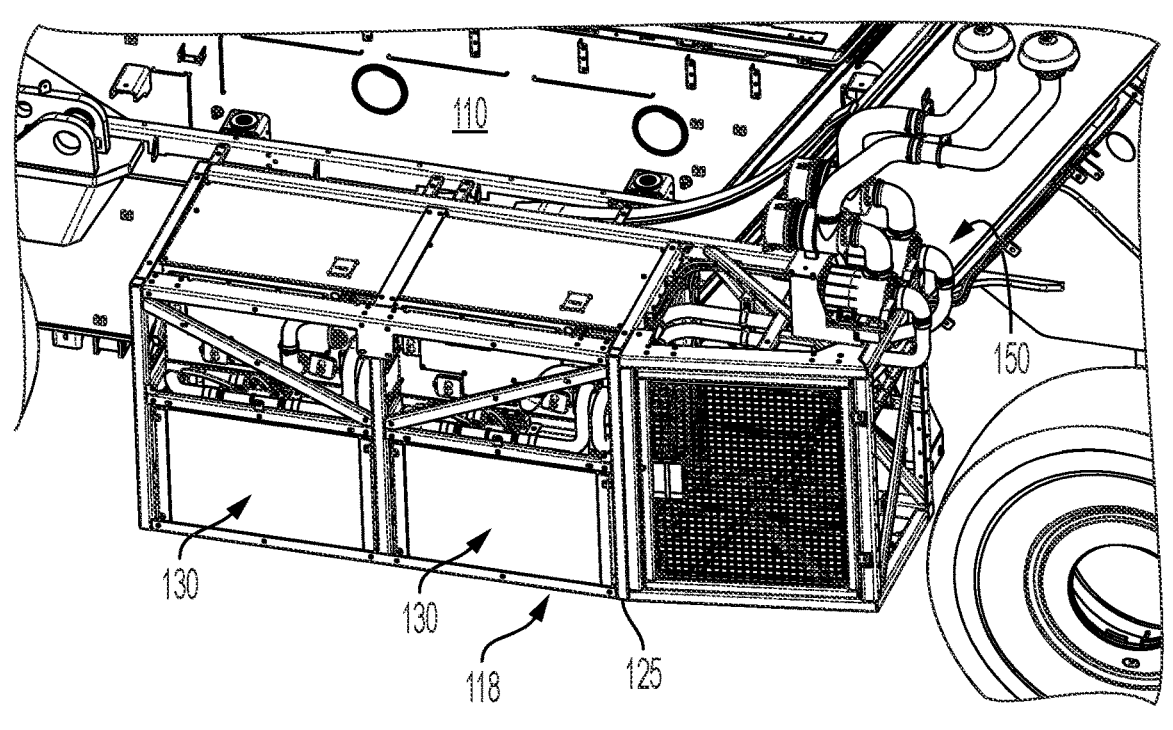
FIG. 10 is an isometric illustration of the modular frames of FIG. 3 including fuel cells for a fuel-cell vehicle.
Figures 11, 12:
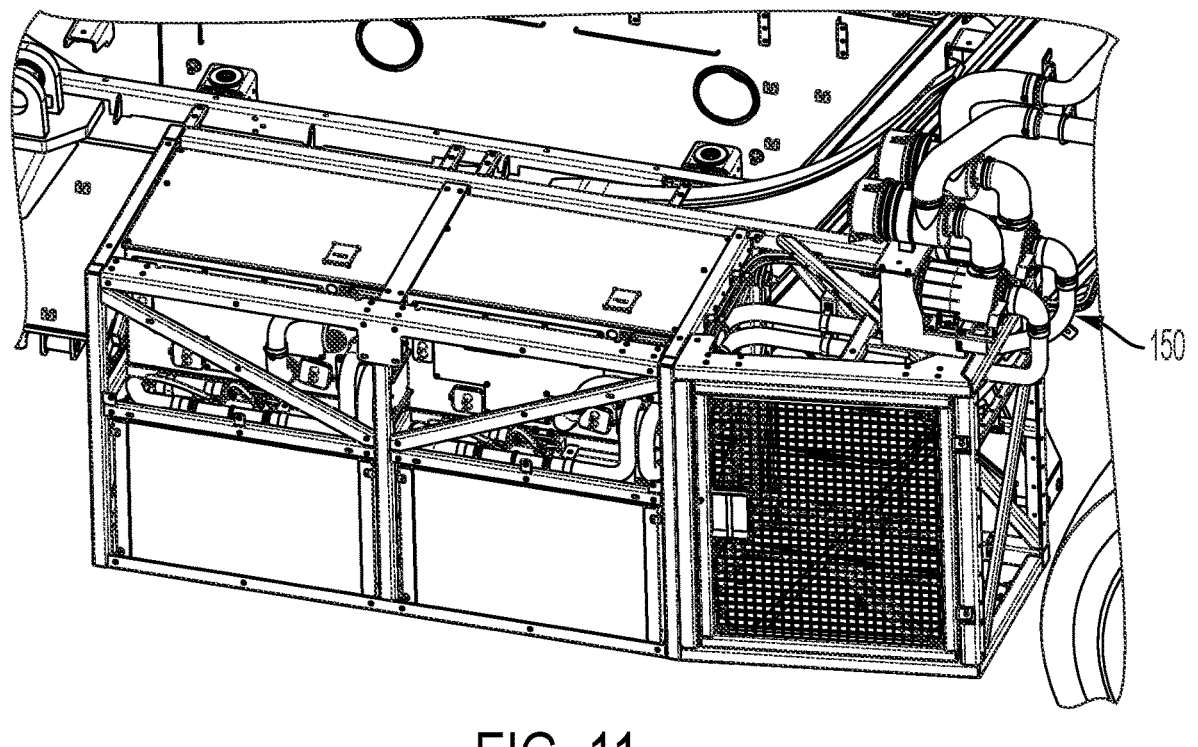
FIG. 11 is a close-up view of the fuel cells of FIG. 10.
FIG. 12 is a rear view of the modular fuel cells of FIG. 10, further illustrating the components and connections of the modular fuel cell systems according to principles of the present inventive concepts.

Customers can therefore select a desired combination of fuel cells 130, hydrogen storage tanks 140, batteries, and related components based on their specific needs. The truck 100 can either be supplied with the desired components by the factory or dealer using a modular assembly, or the customer can easily provide the vehicle 100 with the desired components on-site. Additionally, the configuration of fuel cell 130, battery, and hydrogen storage tank 140 components can be readily modified by the customer as needs change. Referring specifically to FIG. 9, for example, additional hydrogen tanks 140 can be provided in an add-on modular frame 125A to increase the hydrogen storage capacity of the vehicle 100.

Accordingly, a vehicle 100 constructed according to these inventive principles can use modular and standard interfaces to equip a conventional frame 115 for a reach stacker vehicle 100 with fuel cell components. The electric drive train components (electric motor, etc.) can be arranged in the space 105 between the longitudinal frame members 110 and 112 of the main frame 115. To accommodate the hydrogen fuel cell 130, hydrogen cylinders 140, Li-Ion batteries (not shown), and DC/DC inverter 131, brackets 120 are secured to the frame 115 so that modular frames 125 can be added to the main frame 115.

A modular frame 125 may be pinned into the brackets 120 using pin-and-lock connectors 123, nuts and bolts, or other desired mechanical connection members. The modular frame 125 may be secured to the main frame 115 via the brackets 120 before components are added to the modular frame 125. Alternatively, components, such as Li-ion batteries, a DC/DC inverter 131 and 134, an EMC filter box 132, and truck cooling manifolds 133 may be assembled into the modular frame 125 before the modular frame 125 is secured to the main frame 115. Similarly, hydrogen storage cylinders 140 and hydrogen fuel cells 130 may be assembled into modular frames 125 before, or after, the modular frame 125 is secured to the main frame 115.

The modular arrangement described above provides scalability of $H_2$ storage modules (e.g., four or six $H_2$ storage tanks) as well as scalability of fuel cell engines (e.g., one or two fuel cells) to meet different customer application demands and to optimize truck cost. The use of modular frames 125 further supports customer configurability for different application demands. For example, the desired components can be pre-assembled into a modular frame 125 to meet a particular customer demand before being provided for customer assembly into a reach stacker 100 at their own facility. Therefore, different combinations of fuel cells 130, hydrogen storage containers 140, EMC filter boxes 132, cooling systems 133, batteries, inverters 131, etc., can be custom assembled off of the truck 100 into modular frames 125 to meet the specific configurations ordered by customers instead of directly assembling such components onto the main frame 115 at the factory where the vehicle 100 is produced. Those modular frames 125 can then be shipped to the customer for assembly into the vehicle 100.

Using modular frames 125 also makes upgrading to higher/different configuration within a customer facility or by dealers simple. An entire modular frame 125 could be removed from a truck and replaced with a new modular frame 125 containing upgraded or different components. Alternatively, parts within a modular frame 125 could be removed and/or replaced or additional modular frames 125A could be added.

As explained above, the use of the same integration parts 150 (like tubing, cables, radiators, etc.) also leads to less expensive assemblies by providing higher parts volumes and fewer part numbers to maintain. In other words, by making the mechanical and electrical connections to the truck 100 from the components contained in a modular frame 125 identical, or nearly identical, regardless of the type or configuration of components in the modular frame 125, fewer parts can be used across different truck configurations.

CONCLUSION

Various other improvements are also contemplated and numerous variations to the specific designs identified above are possible without departing from the spirit and scope of the inventive concepts. Having described and illustrated principles of the present inventive concepts in various preferred embodiments thereof, it should be apparent that the invention can be modified in arrangement and detail without departing from such principles. In particular, it should be apparent that the systems and methods described herein could be used for vehicles other than reach stackers and for other moving devices and that various modular arrangements of many different types of components could be facilitated. As another example, it should be apparent that the systems and methods described herein could be used with rechargeable batteries other than Li-ion batteries.

The terms and descriptions used above are set forth by way of illustration and example only and are not meant as limitations. Those skilled in the art will recognize that many variations, enhancements, and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A modular assembly for connecting at least one fuel cell to a lift truck, said modular assembly comprising:

a modular frame having an internal space configured to receive at least one of a fuel cell, a hydrogen storage tank, a lithium-ion battery, and a battery cooling system; and wherein the modular frame is configured to connect to a first pair of brackets extending vertically along a frame of the lift truck, wherein the modular frame comprises a vertically arranged frame member that fits between the first pair of brackets and comprises a hole that corresponds to holes in each bracket of the first pair of brackets to receive a connector that connects the modular frame to the brackets; and one or more integration members arranged along the modular frame including mechanical and electrical connectors for connecting the lift truck connection members to the components housed in the at least one modular frame, wherein the integration members are the same regardless of the components contained in the internal space of the modular frame, such that the integration members are the same for a modular frame housing a battery, a modular frame housing a fuel cell, a modular frame housing a hydrogen storage tank, and a modular frame housing a battery cooling system, thereby permitting the modular frame to mechanically and electrically connect with the lift truck without modification of the connection members on the lift truck regardless of the components contained in the modular frame.

2. The modular assembly according to claim 1, wherein the connector is a pin and lock connector.

3. The modular assembly according to claim 1, wherein the internal space houses a fuel cell and wherein the integration members used to connect components arranged within the internal space of the modular frame are configured such that the same connections are used to connect components to the lift truck regardless of the number of fuel cells arranged within the internal space of the modular frame.

4. The modular assembly according to claim 1, wherein the modular frame further houses one or more batteries and a battery cooling system within the internal space of the modular frame.

5. The modular assembly according to claim 1, further comprising at least one additional modular frame configured to receive one or more hydrogen storage containers therein, wherein the at least one additional modular frame comprises a vertically arranged frame member configured to fit between a second pair of brackets arranged on an opposite side of the lift truck from the first pair of brackets, the vertically arranged frame member comprising a hole that corresponds to holes in the second pair of brackets to receive a connector that connects the modular assembly to the brackets.

6. The modular assembly according to claim 5, wherein at least four hydrogen storage tanks are contained within the at least one additional modular frame and wherein the integration members are the same as for a system where there is a single hydrogen storage tank contained within the at least one additional modular frame.

7. The modular assembly according to claim 6, wherein six hydrogen storage tanks are contained within one or more modular frames and wherein the integration members are the same as for a system containing only four hydrogen storage tanks within the at least one additional modular frame.

8. The modular assembly according to claim 5, wherein the at least one additional modular frame is connected to the pair of brackets using a pin-and-lock connector.

9. The modular assembly according to claim 1, wherein the modular assembly is pre-assembled with desired components before shipping to a customer.

10. The modular assembly according to claim 1, wherein one modular frame can be readily removed from the lift truck and replaced with a different modular frame having different components to change the functionality of the lift truck without having to modify the integration members for connecting the mechanical and electrical components of the modular frame to the lift truck.

11. A method of adapting a lift truck frame to operate using an electrical system, the method comprising:

arranging an electric drive train within a central opening between longitudinal frame members of the lift truck;

connecting one or more vertically arranged pairs of brackets to one or more of the longitudinal frame members;

securing a vertically arranged frame member of at least one modular frame to at least one of the one or more pairs of brackets, wherein the at least one modular frame houses one or more components selected from a group comprising a fuel cell, a hydrogen storage tank, a lithium-ion battery, and a battery cooling system; and providing one or more integration members including mechanical and electrical connectors for connecting the lift truck connection members to the components housed in the at least one modular frame, wherein the integration members are the same for a modular frame housing a battery and a modular frame housing a fuel cell, thereby permitting the modular frame to mechanically and electrically connect with the lift truck without modification of the connection members on the lift truck regardless of the components contained in the modular frame.

12. The method according to claim 11, wherein the at least one modular frame houses one or more fuel cells.

13. The method according to claim 12, wherein the at least one modular frame houses two or more fuel cells.

14. The method according to claim 11, wherein the vertically arranged frame member and corresponding pair of brackets each comprise corresponding holes to receive a connector to connect the frame member to the pair of brackets.

15. The method according to claim 11, wherein the at least one modular frame houses a plurality of hydrogen storage tanks.

16. The method according to claim 11, wherein the integration members comprise one or more of:

tubing, cables, and radiators.

17. A reach truck comprising:

a frame comprising two longitudinally arranged frame members having a space between them;

one or more pairs of brackets vertically arranged along one or more of the longitudinally arranged frame members;

at least one modular frame having a vertically arranged frame member connected to at least one of the pairs of brackets;

a plurality of components arranged within the at least one modular frame based on user needs, wherein the plurality of components are selected from a group comprising a lithium-ion battery, a fuel cell, a hydrogen storage tank, and a battery cooling system; and integration members configured to mechanically and electrically connect the components arranged in the modular frame to the reach truck, wherein the integration members are the same regardless of whether the modular frame houses a fuel cell, a hydrogen storage tank, a lithium-ion battery, or a battery cooling system.

18. The reach truck according to claim 17, wherein the at least one modular frame comprises two or more modular frames with at least one modular frame connected to each side of the reach truck.

19. The reach truck according to claim 17, wherein the plurality of components comprises at least one fuel cell and at least one hydrogen storage tank.

20. The reach truck according to claim 17, wherein the integration members comprise one or more of tubing, cables, and radiators.

* * * * *